United States Patent [19]
Gabzdyl et al.

[11] Patent Number: 6,038,675
[45] Date of Patent: Mar. 14, 2000

[54] DATA PROCESSING CIRCUIT

[75] Inventors: Rebecca Gabzdyl, Frimley; Brian Patrick McGovern, Camberley, both of United Kingdom

[73] Assignee: Nokia Mobile Phones Limted, Espoo, Finland

[21] Appl. No.: 09/037,449

[22] Filed: Mar. 10, 1998

[30] Foreign Application Priority Data

Mar. 14, 1997 [GB] United Kingdom ................... 9705295

[51] Int. Cl.⁷ ....................................................... G06F 1/10
[52] U.S. Cl. ........................................................... 713/600
[58] Field of Search ................................. 713/500, 600; 712/1, 28, 32

[56] References Cited

U.S. PATENT DOCUMENTS

| | | | |
|---|---|---|---|
| 5,440,707 | 8/1995 | Hayes et al. ................................. | 711/3 |
| 5,535,343 | 7/1996 | Verseput ................................... | 710/128 |
| 5,668,982 | 9/1997 | Davis ....................................... | 713/600 |
| 5,706,485 | 1/1998 | Barkatullah et al. .................... | 713/401 |
| 5,737,323 | 4/1998 | Lansdowne ............................. | 370/311 |
| 5,740,129 | 4/1998 | Frampton ................................. | 368/10 |
| 5,742,188 | 4/1998 | Jiang et al. .............................. | 327/99 |
| 5,758,278 | 5/1998 | Lansdowne ............................. | 455/343 |
| 5,838,672 | 11/1998 | Ranta ..................................... | 370/335 |
| 5,907,587 | 5/1999 | Sokoler .................................. | 375/368 |
| 5,912,570 | 6/1999 | Kuusisto ................................ | 327/142 |
| 5,917,868 | 6/1999 | Kuusinen ............................... | 375/354 |

*Primary Examiner*—Thomas M. Heckler
*Attorney, Agent, or Firm*—Perman & Green, LLP

[57] ABSTRACT

A data processing circuit includes a first set of processing elements and a second set of processing elements. A clock provides common clocking signals to the processing elements, however, the first set of elements are clocked by rising edges of the clocking signals and the second set of elements are clocked by falling edges of the clocking signals.

20 Claims, 10 Drawing Sheets

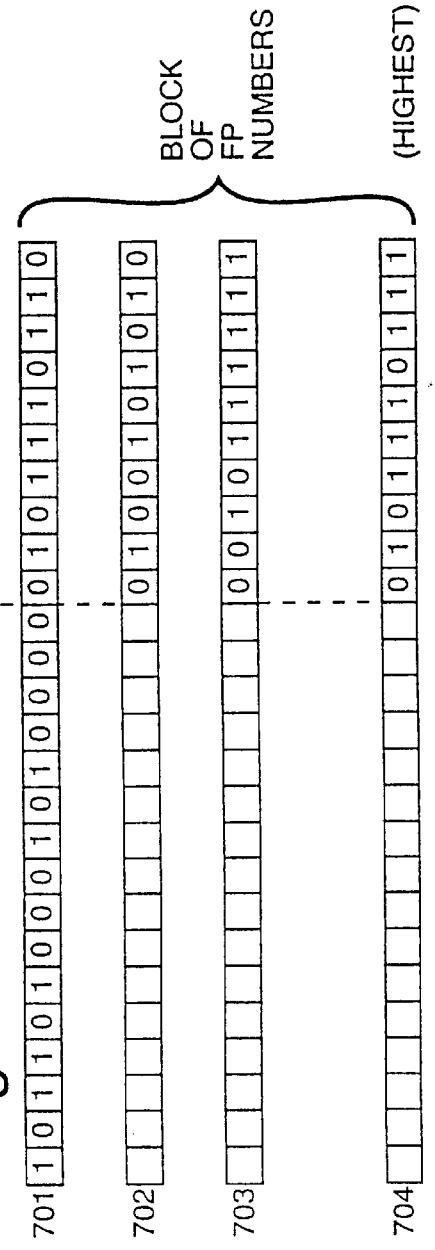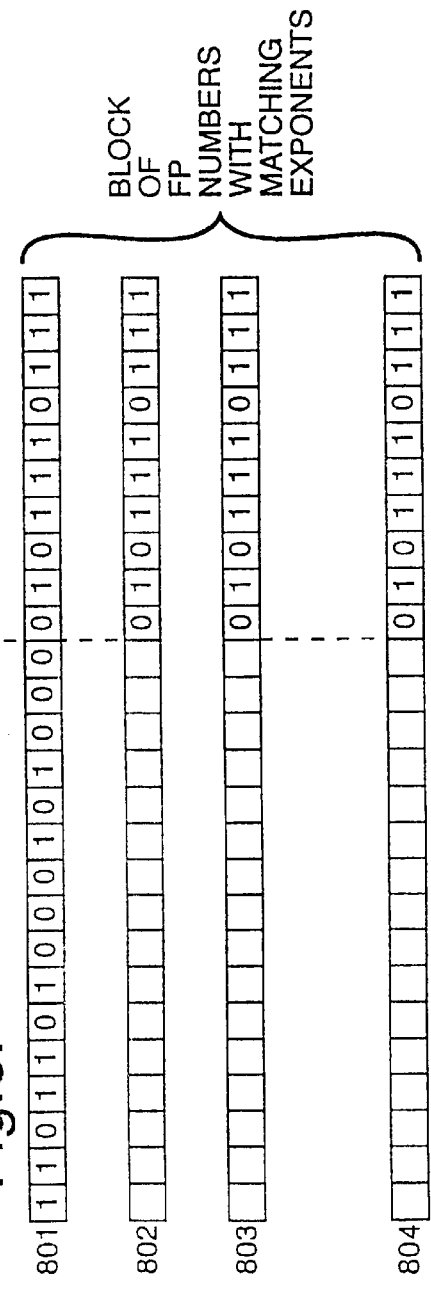

DATA PROCESSING CIRCUIT

BACKGROUND OF INVENTION

The present invention relates to a data processing circuit, including a set of processing elements.

Many environments require the real time processing of data. Digital signal processors are often configured to perform multiplications upon data with subsequent arithmetic operations, such as an accumulation, being executed by an arithmetic unit.

In many applications, it is desirable to perform manipulations quickly while at the same time minimising power consumption. Although a great deal of versatility is available through the use of software instructions, such instructions may result in a device taking up valuable processing time while implementing relatively straightforward operations. It is therefore desirable to optimise the provision of specific hardware circuitry such that each device is operating to its optimum level of performance. Additionally, it is desirable to minimise the area taken up by such circuitry.

BRIEF SUMMARY OF INVENTION

According to a first aspect of the present invention, there is provided a data processing circuit, including a first set of processing elements and a second set of processing elements; and clocking means configured to supply common clocking signals to said processing elements, wherein said first set of elements are clocked by rising edges of said clocking signals and said second set of elements are clocked by falling edges of said clocking signals.

Preferably, processing operands are supplied alternately from a common data bus.

In a preferred embodiment, results from said first set of elements and results from said second set of elements are suppliable to a common double-clocked processing means, wherein said double-clocked processing means processes information associated with said first set of processing elements on said rising edge and processes information associated with said second set of processing elements on said falling edge. Preferably, the double-clocked processing means performs comparison and selection operations.

BRIEF DESCRIPTION OF DRAWINGS

FIG. 7 shows a block of floating point numbers;

FIG. 8 shows a block of floating point numbers similar to the block shown in FIG. 7, normalised so as to have matching exponent values;

DETAILED DESCRIPTION OF PREFERRED EMBODIMENTS

The invention will now be described by way of example only with reference to the previously identified drawings.

The present invention has many applications, particularly in systems having a significant level of embedded software. The invention has particular application in environments where the optimisation of processor efficiency is highly desirable, particularly when operating from battery sources etc. As an example of such an environment, the invention will be described with respect to a mobile telephone, although it should be appreciated that many other applications are also relevant.

Figure 1:
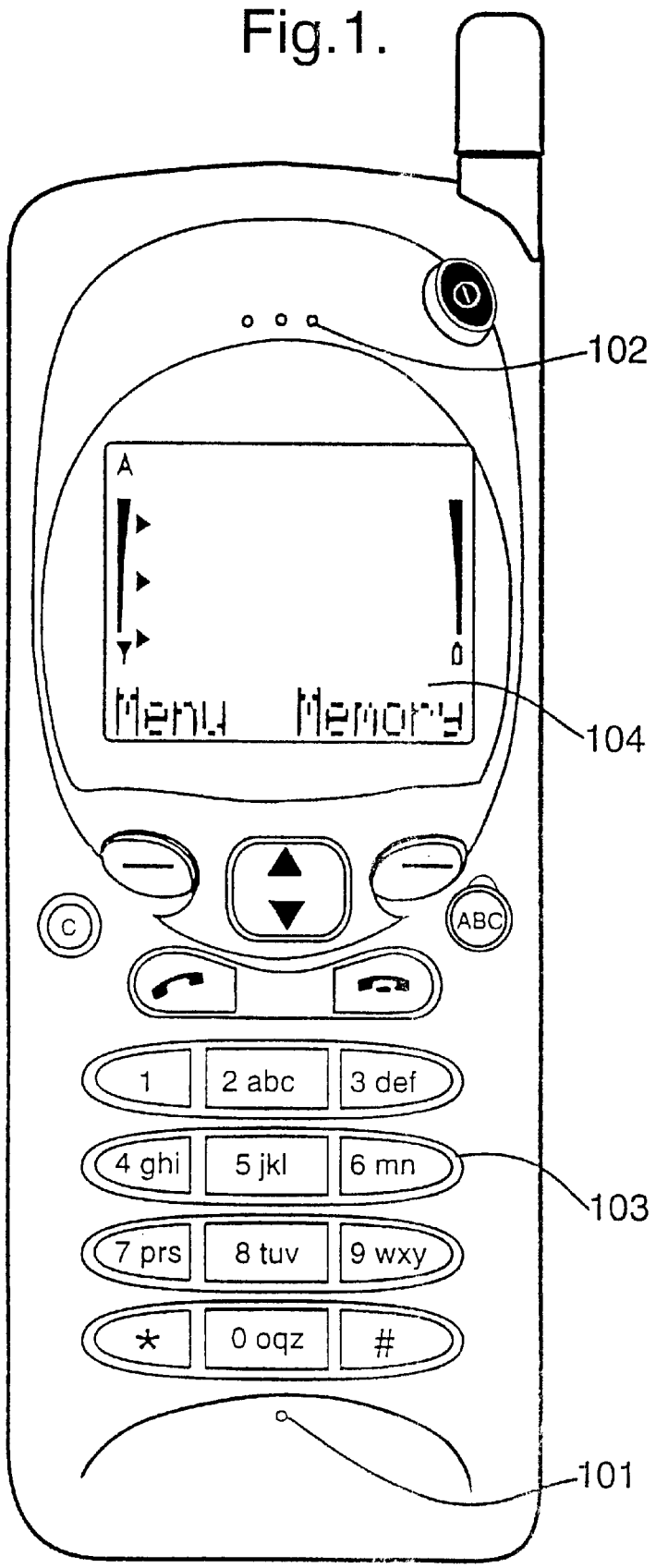
FIG. 1 shows a digital mobile telephone having digital signal processing circuitry.

A mobile telephone is shown in FIG. 1 configured to operate digitally in accordance with GSM recommendations. The telephone includes a microphone 101 arranged to receive speech utterances in combination with a loudspeaker 102 arranged to supply received voice signals to an operator's ear. The telephone includes manually operable buttons 103 and a visual display 104.

Figure 2:
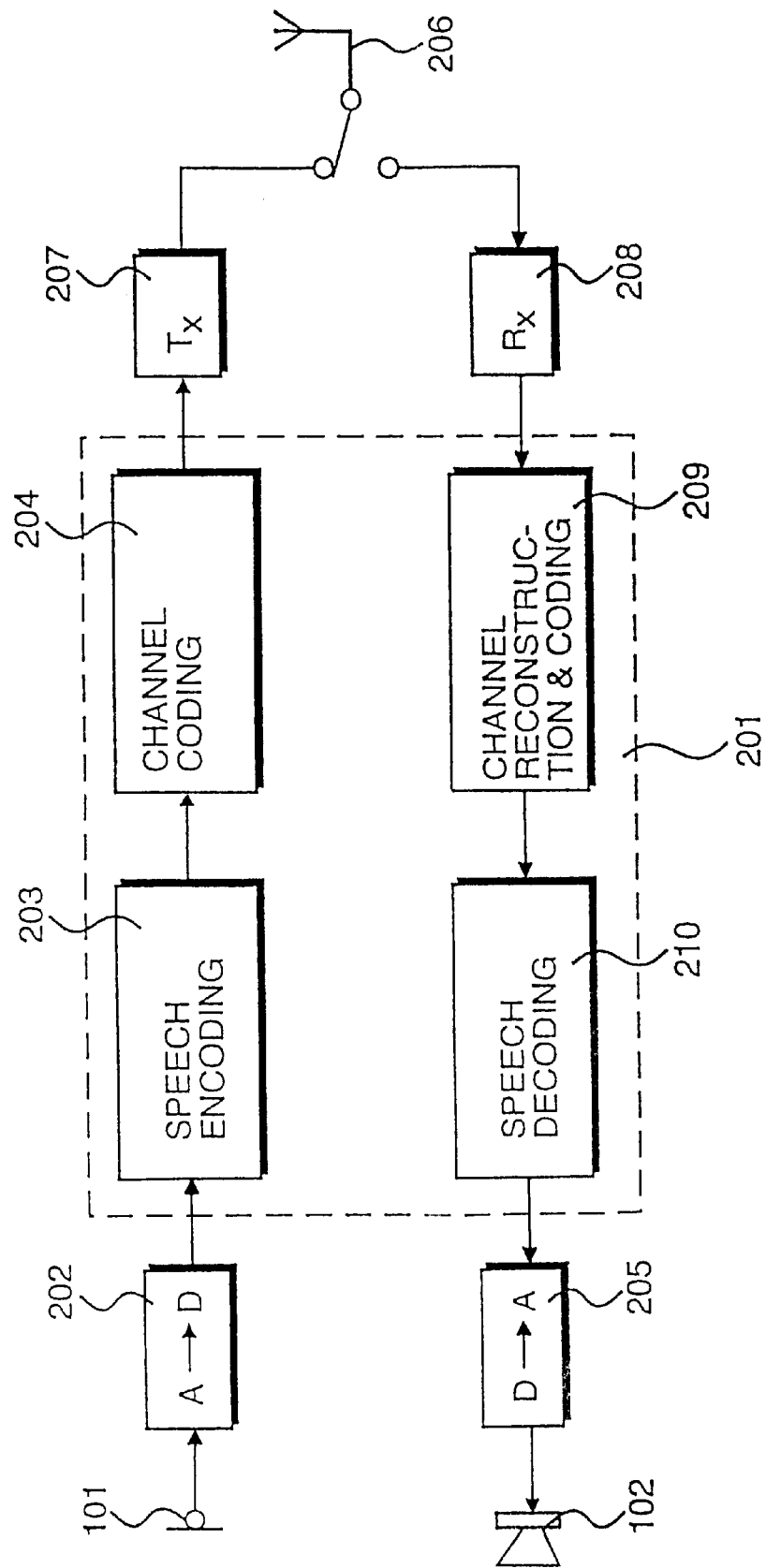
FIG. 2 details the functionality of the mobile telephone shown in FIG. 1, including the functionality of digital processing circuits.

The mobile telephone shown in FIG. 1 includes a digital data processing circuit 201 as shown in FIG. 2. The processing circuit receives digital input signals from an analogue to digital converter 202 which in turn receives analogue speech signals from microphone 101. Within the data processing circuit 201, digital signals from the analogue to digital converter 202 are supplied to a speech encoding subsystem 203 which in turn supplies encoded speech to a channel coding subsystem 204. Loudspeaker 102 receives an output from the data processing circuit 201 via a digital to analogue converter 205. A radio antenna 206 receives transmission signals from a transmitter 207 which is in turn arranged to receive outputs from the channel coding subsystem 204. The antenna 206 is also shared with a receiving circuit 208 which supplies input signals to a channel reconstruction and decoding subsystem 209 within the data processing circuit 201. The output from system 209 is supplied to a speech decoding subsystem 210 which provides digital speech signals to the digital to analogue converter 205.

The overall power consumption for the device will be determined to a large extent by the efficiency of the data processing circuit 201 and many possible architectures may be considered in order to implement an appropriate data processing circuit of this type.

Figure 3:
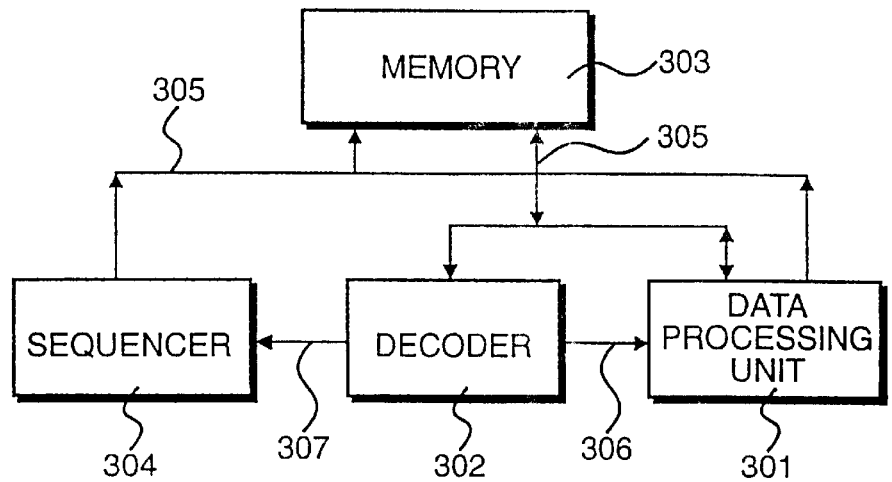
FIG. 3 illustrates a conventional digital signal processing environment, including a data processing unit.

A very basic processor architecture is shown in FIG. 3, consisting of a data processing unit 301, a decoder 302, memory 303 and a program sequencer 304. In operation, the program sequencer identifies a memory location which is supplied to an address bus 305, resulting in a program instruction being read from memory 303. This program instruction is supplied to the decoder 302 over an instruction/data bus 305 and the decoder is arranged to supply control signals to the data processing unit 301 over a control signal bus 306. In addition, control signals from the decoder 302 may also be supplied over bus 307 to the sequencer 304.

The problem with the architecture shown in FIG. 3 is that the period between adjacent clock edges must be made larger than the cumulative delay of all operations to be performed within a single clock period. In practice, the writing and reading of data from the memory 303 will represent a significant time delay and this in turn will reduce the overall operational speed of the system.

Figure 4:
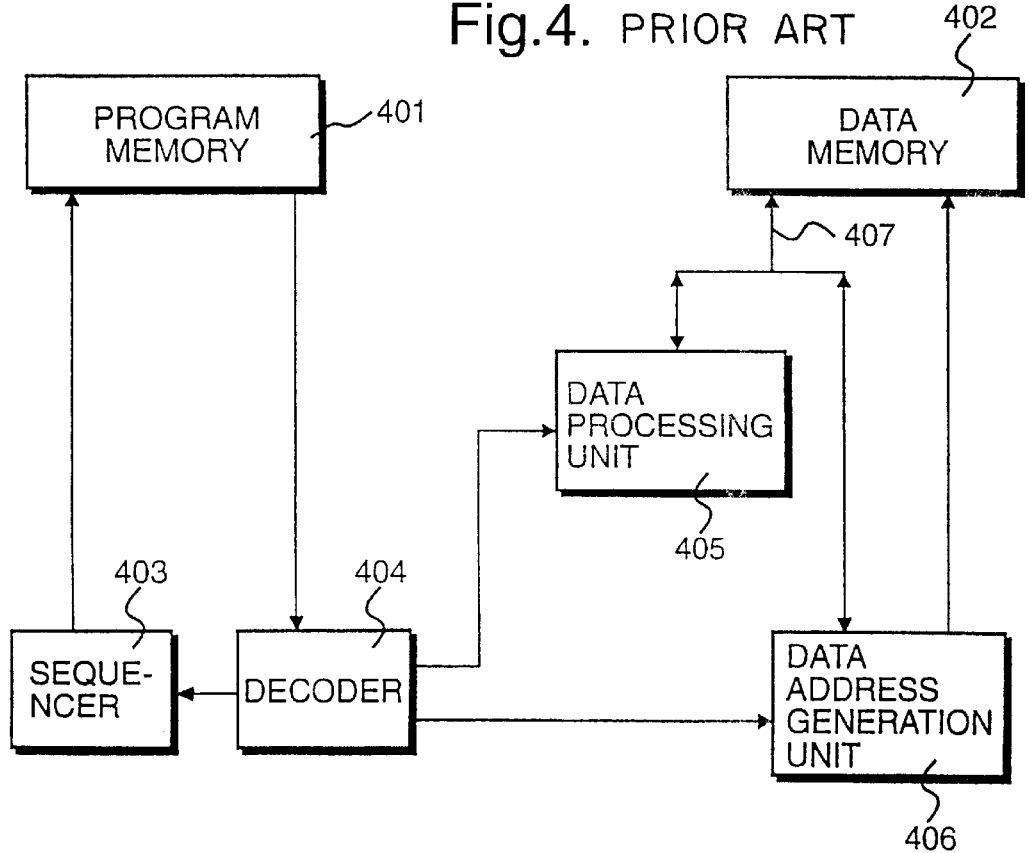
FIG. 4 illustrates an alternative digital signal processing environment having a data processing unit.

A known approach to improving performance is illustrated in FIG. 4 in which program instructions are held within their own program memory 401 with data being held in data memory 402. In addition, buffer registers are also included between devices such that, in preference to all operations occurring within a single clock period, one clock period delays are tolerated such that data transfers between individual processors or devices are multiplexed together in a pipelined manner. Thus, in this environment, the minimum clock period is determined by the longest delay of any one particular component rather than the sum of the components. Thus, a program sequencer 403 generates program address values to address program instructions within the program memory 401. In response to receiving an address, the program memory 401 supplies an instruction to a decoder 404 which in turn issues control signals to a data processing unit 405. The decoder 404 is also responsible for supplying control signals to a data address generating unit 406 which in turn addresses the data memory 402.

When a program instruction has been addressed from the program memory 401 it is retained within an internal register. The decoding of this program instruction is then performed on the next clock cycle, in parallel with the subsequent generation of an address from the sequencer 403. Similarly, execution within the data processing unit 405 may occur on the next processing cycle such that an operation which would have been performed within one clock cycle within the architecture shown in FIG. 3 is effected over three clock cycles within the architecture shown in FIG. 4. However, on each clock cycle the devices are in operation therefore the processing of information is being performed in a pipelined manner. This allows the clock speed to be significantly increased but it does introduce a disadvantage in that the pipeline must be cleared when a conditional jump occurs. In the preferred embodiment, the data processing circuit 201 is implemented in accordance with the architecture illustrated in FIG. 4. The pipelined nature of the architecture as shown in FIG. 4 provides advantages over the architecture shown in FIG. 3 but the extent to which pipelining may be employed to improve performance is limited and if further performance improvements are required other areas must be investigated for modification.

Figure 5:
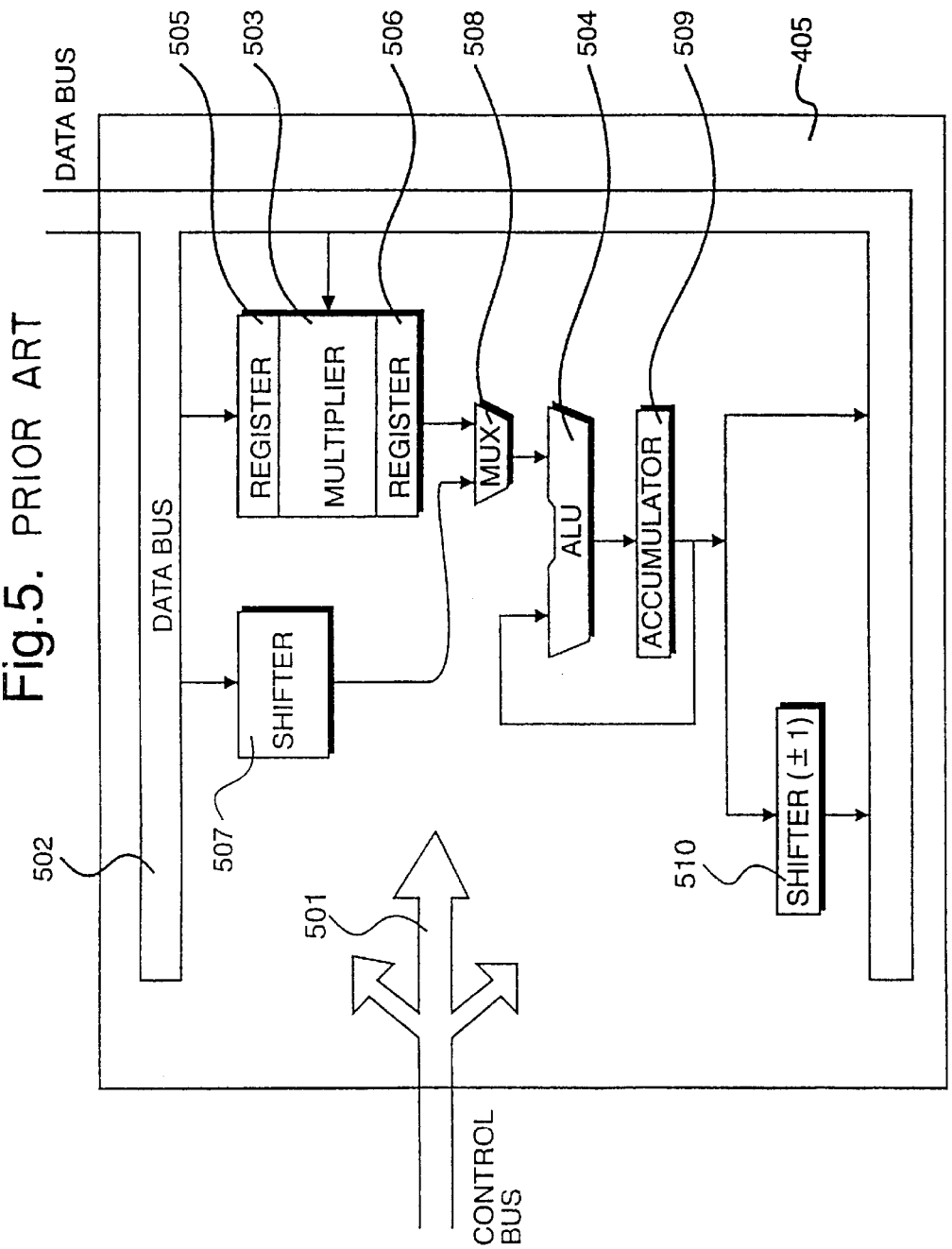
FIG. 5 illustrates a known data processing unit of the type identified in FIG. 6.

A known example of a processing unit of type 405 is illustrated in FIG. 5. Control signals received from a control bus permeate throughout the device, as shown generally at 501. A data bus 502, connected to the data memory 402, extends within the data processing unit 405. The unit includes a multiplier 503 and an arithmetic logic unit 504. The multiplier includes a first register 505 arranged to receive a first operand from the data bus 502. The multiplier 503 is then configured to multiply this first operand, received from register 505, with a second operand received directly from the data bus 502. The result of the multiplication is then supplied to a second register 506.

The unit also includes a barrel shifter 507 arranged to shift data received from data bus 502. The outputs from shifter 507 and register 506 may be selectively supplied to the arithmetic logic unit 504 via a multiplexer 508. The output from the arithmetic logic unit 504 is supplied to an accumulator 509 which is configured to accumulate values supplied to the arithmetic logic unit 504 by means of its output being fed back to the arithmetic logic unit 504. The output from the accumulator may be supplied directly to the data bus or the position of bits from the output of the accumulator may be shifted via a second shifter 510.

As far as the speed of operation of the device shown in FIG. 5 is concerned, the overall speed will be controlled by the operation of multiplier 503. Further pipelining may be introduced within multiplier 503 but, as previously described, this will introduce further delays which may have repercussions during the operation of the device. Thus, a trade-off exists between the level of pipelining within multiplier 503 and its response to conditional jumps such that the extent to which the speed of operation of multiplier 503 may be increased is somewhat limited.

Figure 6:
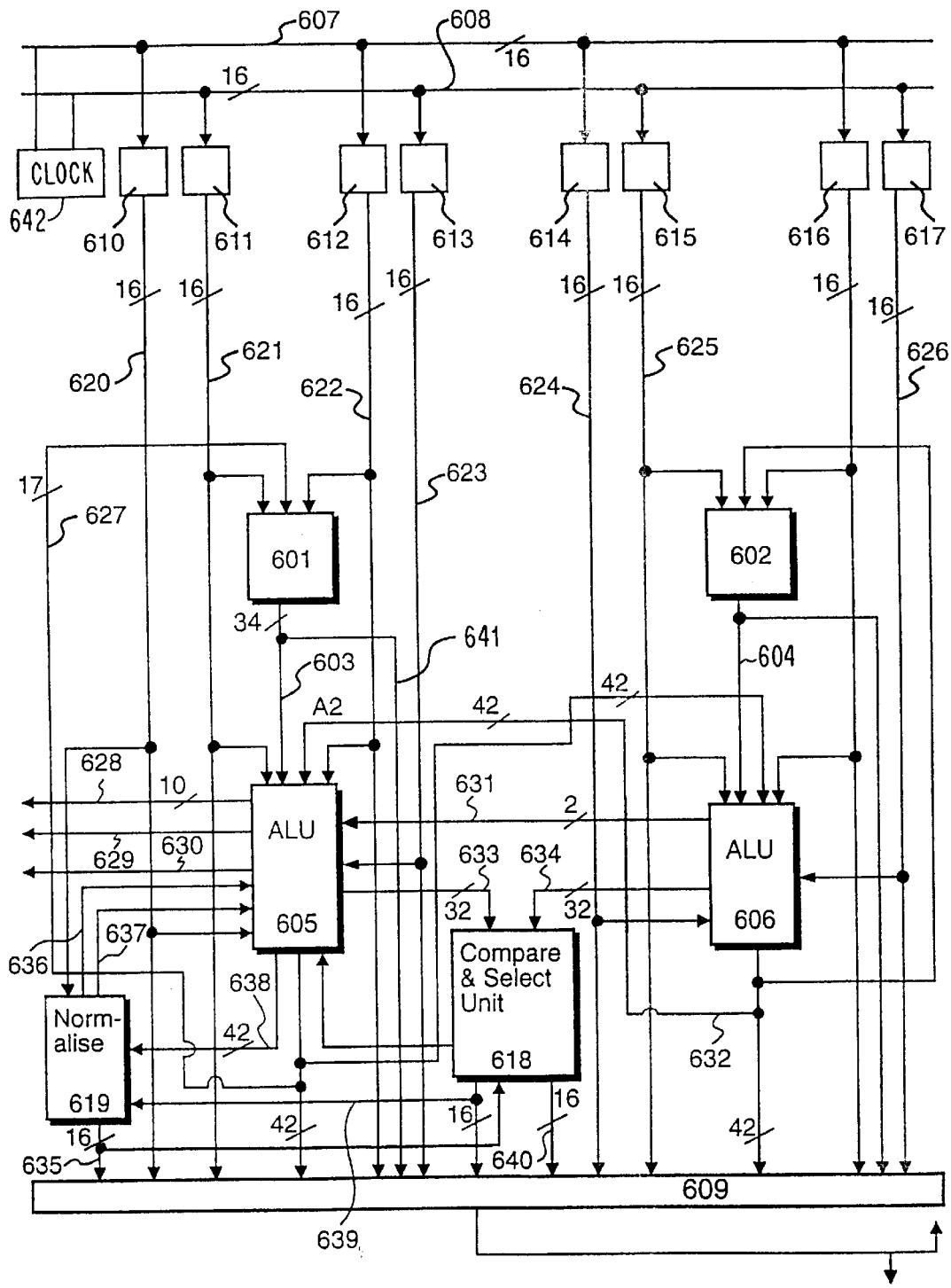
FIG. 6 shows an alternative data processing unit of the type shown in FIG. 4, embodying the present invention and including two multipliers, two arithmetic logic units, a compare and select unit and a normalisation unit to facilitate the processing of floating point numbers.

An alternative solution embodying the present invention is shown in FIG. 6. The ability of the data processing unit to perform multiplication operations is significantly enhanced by providing a first multiplier 601 and a second multiplier 602. Each multiplier provides a 34 bit output over respective buses 603 and 604 to respective arithmetic logic units, consisting of a first arithmetic logic unit 605, arranged to receive data from bus 603 and a second arithmetic logic unit 606 arranged to receive data from bus 604.

Data bus 407 provides for data transmission between the data processing unit 405 and the data memory 402 shown in FIG. 4. Returning to FIG. 6, this data bus is implemented as two 16 bit buses a first of which, first data bus 607, facilitates reading from the data memory 402 and writing to said data memory. A second data bus 608 is similar to data bus 607 but is only configured to read from the data memory 402.

The data processing unit includes an output multiplexer 609 configured to allow a plurality of output signals to be selectively returned to the first data bus 607 or to the data address generation unit 406.

A full clock cycle may be employed to allow the transfer of data from the data memory, given that each transfer to the data processing unit 405 is buffered by one of eight registers 610 to 617. The processing unit also includes a compare and select unit 618 and a normalising unit 619. All of the unit is clocked from a common clock source 642. However, in order to effectively double the speed of operation, devices to the left of the compare and select unit 618 are clocked on the rising edge of the clock source with devices to the right of the compare and select unit 618 being clocked on the falling edge of the clock source. The compare and select unit 618 is required to operate for both halves of the unit and is therefore clocked in correspondence with both the rising and falling edges of the clock source. Input register 610 receives data from the first data bus 607 and, upon receiving a rising clock edge, clocks 16 bit data to the normalising unit 619 over a bus 620 and to the first ALU 605. Input register 611 clocks data from the second data bus 608 on a rising edge to the first multiplier 601 and to the first arithmetic logic unit 605 over bus 621. Input register 612 clocks data from the first data bus 607 on a rising edge to the first multiplier 601 over bus 622 and to the first ALU 605. Input register 613 clocks data from the second data bus 608 on a rising edge to the first arithmetic logic unit 605 over bus 623.

Input register 614 clocks data from the first data bus 607 on a falling edge to the second arithmetic logic unit 606 over a bus 624. Input register 615 clocks data from the second data bus 608 on a falling edge to the second multiplier 602 and to the second arithmetic logic unit 606 via bus 625. Input register 616 clocks data from the first data bus 607 on a falling edge to the second multiplier 602 and to the second arithmetic logic unit 606 over a bus 625. Input register 617 clocks data from the second data bus 608 on a falling edge to the second arithmetic logic unit 606 via bus 626.

The output from the first multiplier 601, supplied to the first arithmetic logic unit 605 over bus 603, is also supplied over a similar bus 641 to the output multiplexer 609. The output from the arithmetic logic unit 605 is returned to an input of the first multiplier 601 via a bus 627, which also supplies an output to the output multiplexer 609. Similarly, this output is also returned to an input of the second arithmetic unit, effectively as an extension of the same bus.

Ten bit bus 628 and single bit lines 629 and 630 supply data to sequencer 403 to facilitate conditional jumps. The second arithmetic logic unit 606 cannot instigate a conditional jump but overflow conditions may be identified over two control lines 631. The output from the second arithmetic logic unit 606 is returned to an input of the first arithmetic logic unit 605 via a bus 632, which also supplies said output to the output mutliplexer 609 and an input to the second multiplier 602. An output from the first arithmetic logic unit 605 is supplied to the compare and select unit 618 over a 32 bit bus 633 and a similar output is supplied to the compare and select unit 618 from the second arithmetic logic unit 606 over a 32 bit bus 634.

Normalising unit 619 produces an output exponent which is supplied, via a bus 635 to the output multiplexer 609 and to the compare and select unit 618. The normalising unit 619 generates shifting signals which are supplied to the first arithmetic logic unit 605 via shift buses 636 and 637. A 42 bit output is supplied from the first arithmetic logic unit 605 to the normalising unit 619 via a bus 638, while a bus 639 supplies an output from the compare and select unit 618 to the normalising unit 619 and to the output multiplexer 609. The data on bus 639 relates to the left side rising edge sub-cycle and a similar output from the compare and select unit concerning the right side falling edge sub-cycle is supplied to the output multiplexer 609 over a bus 640. For the architecture shown in FIG. 6 and described in relation to a specific embodiment of the invention, arithmetic logic units 605, 606 provide respective exponent values from registers 611, 612, 615, 616 to compare and select unit 618. Optionally, an architecture may be configured such that registers 611, 612, 615, 616 provide exponent values directly to compare a select unit 618. A compare and select unit 618 operates together with both the first arithmetic logic unit and the second arithmetic logic unit and in doing so it may compare a pair of exponent values whereafter one of said pair may be stored, dependent upon the result of the comparison. In this way, an extreme example taken from a plurality of exponent values, usually the largest exponent value is stored by the compare and select unit so as to facilitate subsequent processing and to significantly reduce the operational overhead of the arithmetic logic units. In particular, this stored value may be supplied over bus 639 to the normalising unit 619. In this way, the normalising unit may supply shifting signals to the arithmetic logic unit, in response to comparisons made by the compare and select unit, so as to normalise respective mantissa associated with exponents of floating point numbers considered by the compare and select unit.

In FIG. 7 a block of floating point numbers is represented as comprising floating point number 701, floating point number 702, floating point number 703 and floating point number 704. It should be understood that a large block of floating point numbers is often encountered in data processing. Each floating point number consists of a mantissa and an exponent portion. Typically, a block of floating point numbers of this type will result from a processing algorithm which is used in one of the processors 203, 204, 210 or 209 shown in FIG. 2 operating in the mobile phone. The exponent of floating point number 701, and the exponent of floating point number 702 are similar but not the same. Furthermore the other exponents in the block of floating point numbers are likely to be similar but not identical. In order to perform efficient data processing on a block of floating point numbers, it is preferable to have matching exponents throughout the entire block of numbers.

The arrangement shown in FIG. 6 facilitates efficient translation of a block of floating point numbers of the type shown in FIG. 7, into a block of floating point number of the type shown in FIG. 8, characterised by having identical exponents. There are two stages to the process of conversion from the block of floating point numbers represented in FIG. 7 to the block of floating point numbers shown in FIG. 8. The first process may be performed during generation of the floating point number block, or through a subsequent pass through the block of floating point numbers, during which exponents are compared and the greatest exponent is retained. Under program control, exponents are supplied to the compare and select unit 618, which is capable of performing comparisons between an incoming exponent and a retained high value exponent from previous comparisons. Thereby the exponents in a block of floating point numbers may be compared, and a highest exponent retained.

The second stage of the process, of converting from the block of floating point numbers shown in FIG. 7 to the block of floating point numbers shown in FIG. 8, is performed by the normalising unit 619. The highest value exponent which has been determined by the compare and select unit in the first process is retained as a number which is transferred over bus 639 to the normalising unit 619. The normalising unit receives exponents for each number in the block of floating point numbers to be converted and performs a subtraction between the highest value exponent and the exponents for each number in the block, such that the number of shifts of the mantissa that is required for each floating point number to be normalised to the highest exponent value is determined and supplied to the first arithmetic logic unit 605. The first arithmetic logic unit 605 includes a shifting circuit, which is capable of shifting the mantissa of the floating point number the desired number of binary places in a single cycle. In this way, in a two stage process, the block of floating point numbers shown in FIG. 7 is converted into the block of floating point number shown in FIG. 8, represented as floating point number 801, 802, 803 and 804. Thereby facilitating the manipulation of a block of normalised floating point numbers in the fixed point arithmetic logic unit 605.

Figure 9:
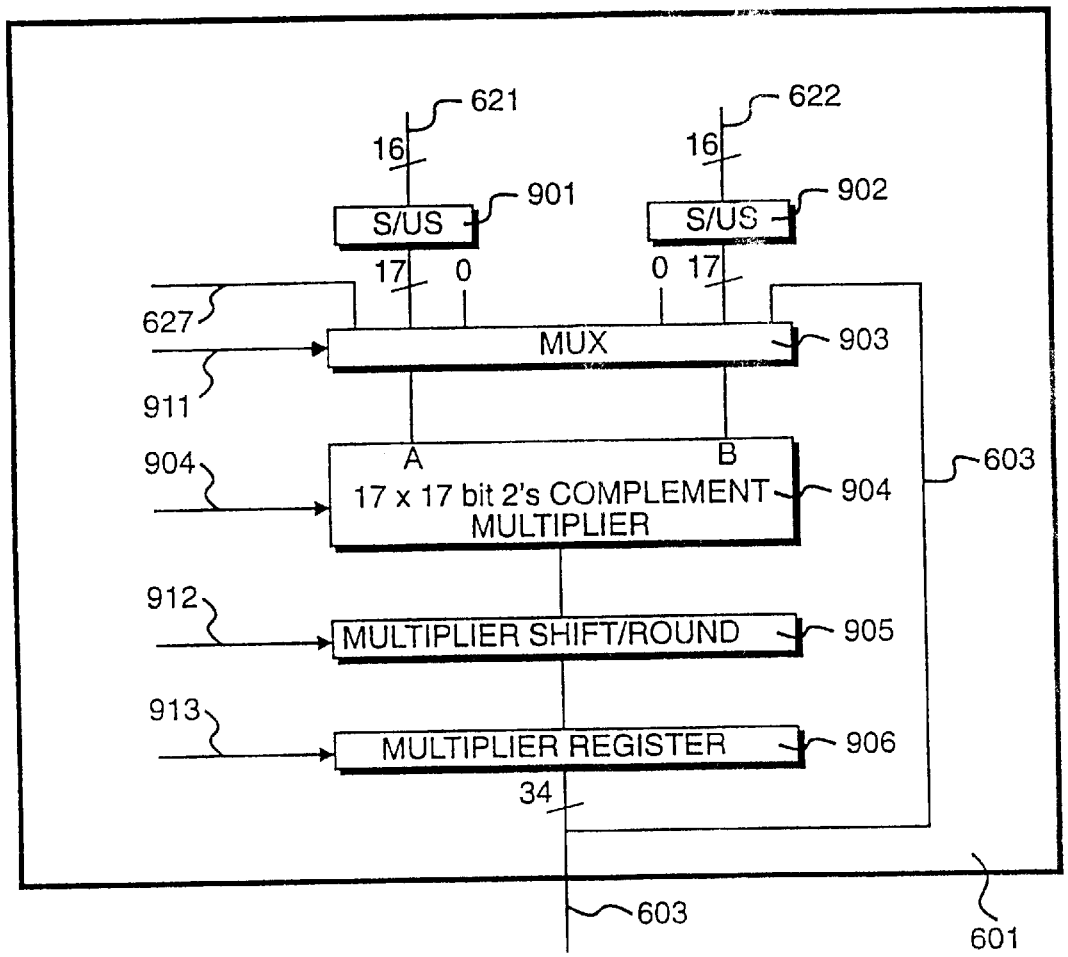
FIG. 9 details one of the multipliers shown in FIG. 6.

The multiplier 601 shown in FIG. 6 is detailed in FIG. 9. A first signed/unsigned multiplexer 901 receives control signals 911 from the sequencer 403. Data signals are received by multiplexer 901 from the data bus 621, which may then be considered as signed or unsigned under control of the sequencer 403. A similar arrangement occurs with a signed/unsigned multiplexer 902 which receives signals from the data bus 622.

A multiplexer 903 supplies A and B signals to a 17 bit two's compliment multiplier 904. The product of this multiplication is supplied to a multiplier shift/round unit 905 which is controlled by control signals 912 from the sequencer 403. The output of the multiplier shift/round unit 905 is supplied to a multiplier register 906 which is controlled by sequencer 403 via control lines 913. The output of multiplier register 906 forms the bus 603, which may be supplied as an input to the multiplexer 903, thus facilitating feedback of multiplication products within the multiplier unit 601 itself. The multiplexer 903 may also receive predetermined fixed zero values as either or both of the multiplication operands, such that circuitry within the multiplier itself may be set to a static value, thereby reducing power consumption.

Figure 10:
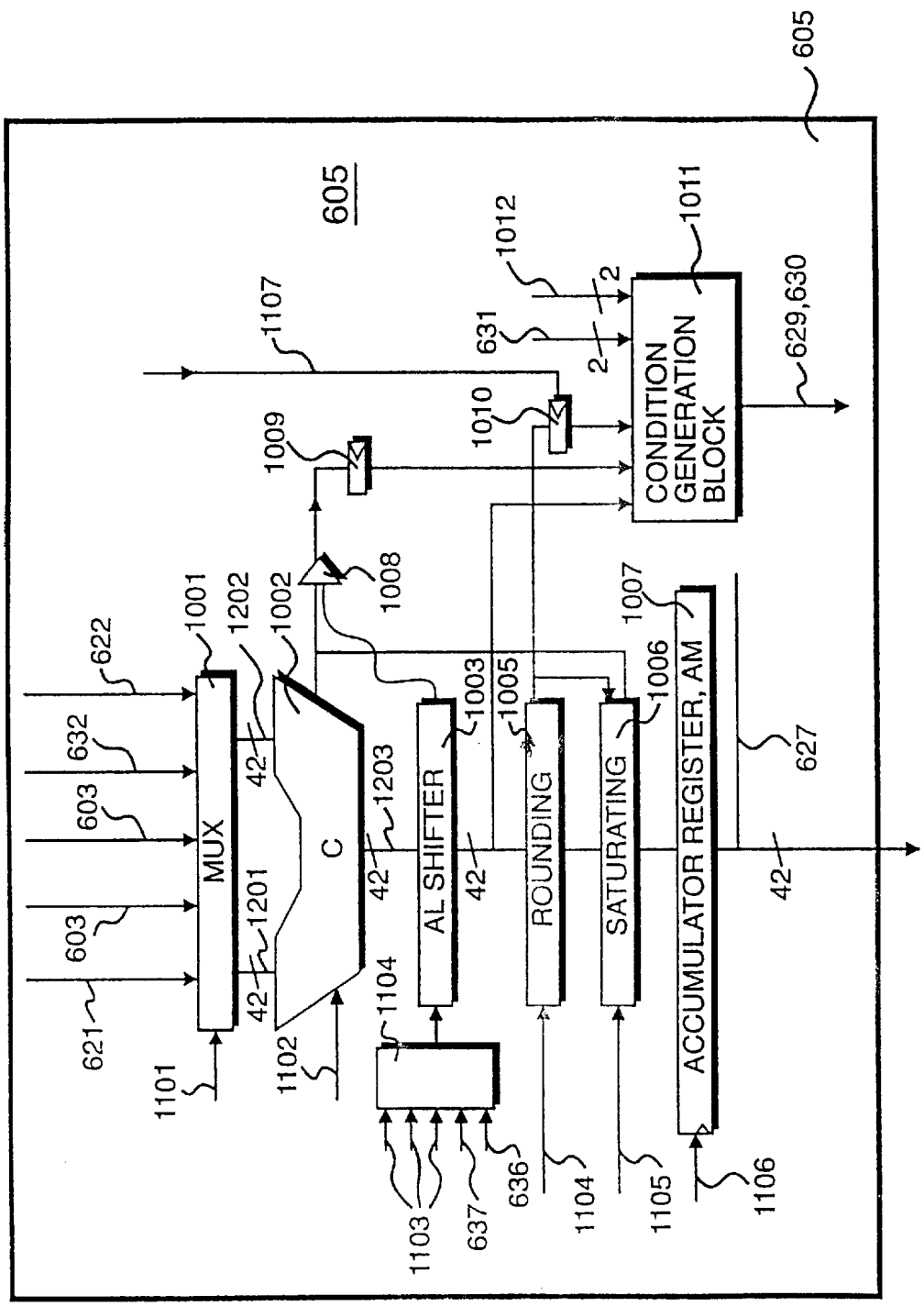
FIG. 10 details one of the arithmetic logic units shown in FIG. 6.

The first arithmetic logic unit 605 shown in FIG. 6 is detailed in FIG. 10. A multiplexer 1001 selects signals from bus 621, bus 603, bus 632, bus 622 or numeric value zero. Multiplexer 1001 is controlled by control signals supplied from the sequencer 403. An arithmetic logic circuit 1002 is controlled by control lines 1102 which are received from the sequencer 403. The arithmetic logic circuit 1002 has an numeric output 1203 which is supplied to an arithmetic logic shifter 1003. The arithmetic logic circuit 1002 further supplies condition signals to condition logic 1008, 1009, which facilitate conditional instructions, and exception condition detection.

The arithmetic logic shifter 1003 is controlled via control logic 1004, by control lines 1103, which are supplied from the sequencer 403. Control logic 1004 is also supplied by buses 636 and 637, which may be used to determine the number of binary places which the shifter should impose upon a binary number received via bus 1203. The output of the arithmetic logic shifter 1003 is supplied to a rounding unit 1005, which is controlled by a control line 1104 from sequencer 403. The rounding unit 1005 is used to convert highly precise but long binary numbers having 42 bits into shorter representations of said numbers, in order that they may be stored efficiently in memory and processed by other parts of the data processing unit which have input word lengths of less than 42 bits. The rounding unit also supplies a condition signal to condition detecting logic 1010, and a saturating circuit 1006.

The saturating circuit 1006 receives the numerical output from the rounding circuit 1005. The saturating circuit 1006 is able to perform a limiting function on numerical values which exceed a predetermined limit, again in order that large binary numbers may be reduced efficiently to a suitable word length for storage or subsequent processing. The saturation circuit 1006 is controlled by control line 1105 from sequencer 403. The saturation circuit may further be controlled by a condition signal from the arithmetic logic circuit 1002, which may indicate when a particular arithmetic logic operation has resulted in a numerical value which must be saturated.

The output of the saturating unit 1006 is supplied to an accumulator register 1007, which is clocked by a clock signal 1106. The accumulator register 1007 supplies signals to buses 627 and 628. Thereby it is possible for the accumulator register 1007 to supply a numerical value back to the multiplexer 1001, for further arithmetic logic operations.

A condition generation block 1011 receives numerical values from the arithmetic logic shifter 1003, and condition signalling from signalling logic 1008, 1009, 1010 and 1012. Signals 1012 are supplied from the compare and select unit 618. The condition generation block 1011 also receives signals from the bus 631. The condition generation unit supplies signals 629 and 630.

Figure 11:
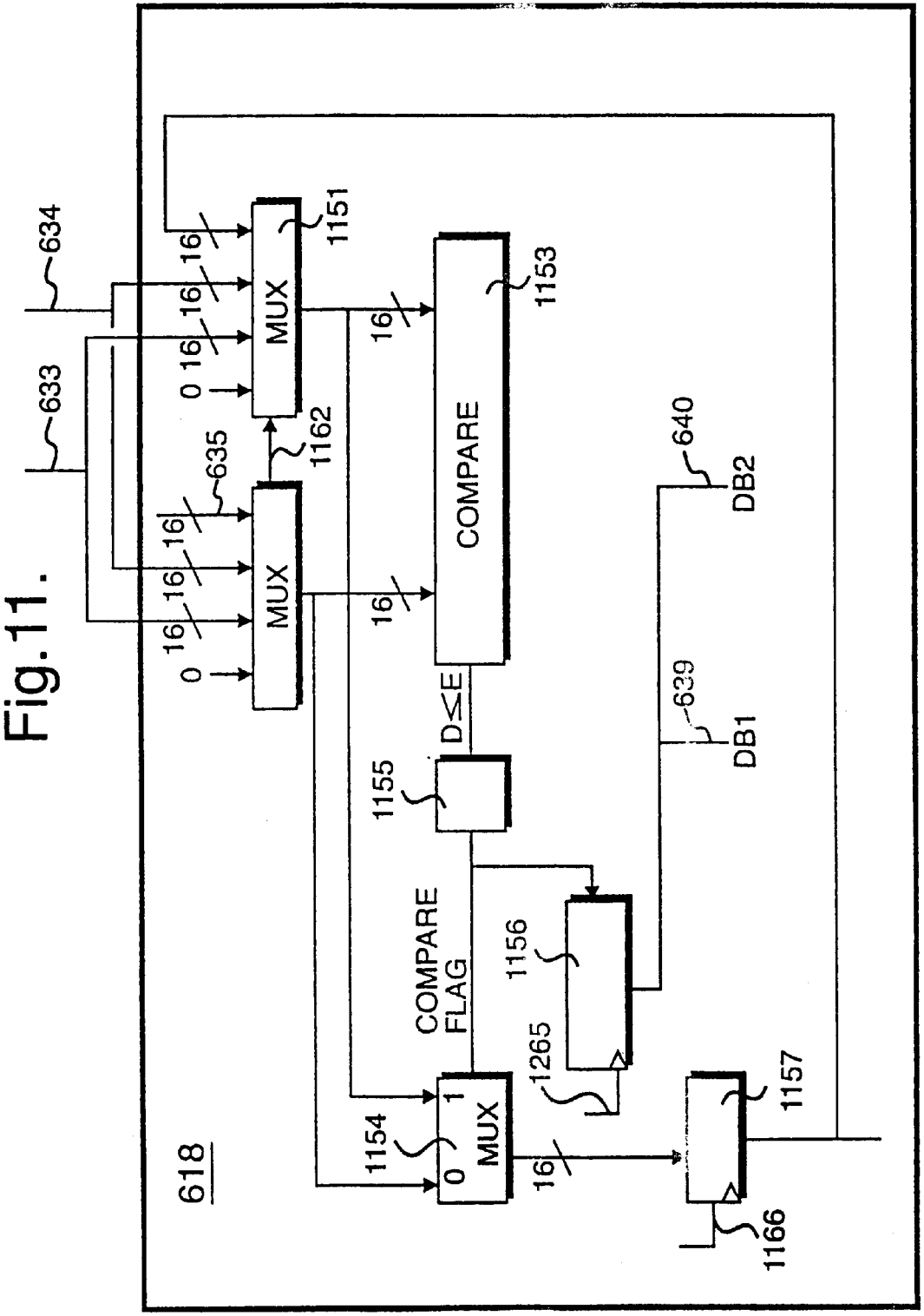
FIG. 11 details the compare and select unit shown in FIG. 6.

The compare and select unit 618 shown in FIG. 6 is detailed in FIG. 11. A low order word input multiplexer 1151 receives input values from bus 633 or bus 634. Alternatively, a zero value may be used as a numerical input to this multiplexer. A high order word input multiplexer 1152 may also receive signals from bus 633, or bus 634, or a numerical value zero. Both input word multiplexers 1151 and 1152 are controlled by control signals 1161 and 1162 which are supplied from the sequencer 403. The low order input word multiplexer 1151 may supply numerical values to a compare unit 1153 or an additional multiplexer 1154. The high order input word multiplexer 1152 supplies its numerical value to a second input of the compare unit 1153, and a second input of the additional multiplexer 1154. A compare unit 1153 generates an indication as to whether the low order word input from multiplexer 1151 is greater than or equal to the high order word input supplied from multiplexer 1152. This indication is supplied as a signal to a maximum or minimum plurality inversion circuit 1155 which generates a compare signal, which is in turn supplied to the additional multiplexer 1154 or a compare select status register 1156.

The high order input word multiplexer 1152 is further capable receiving as an alternate input the output exponent from the normalising unit 619, represented as a bus 635. The output of the additional multiplexer 1154 is supplied as an input to a compare and select register 1157, its contents typically represent the highest of a sequence of compared exponents in a block floating point exponent comparison procedure. In order to facilitate such a procedure, the output of the compare and select register 1157 must be supplied as a numerical value over an internal bus 1199 via the low order word input multiplexer 1151 to the first input of the compare unit 1153. Then, as exponents are supplied to an input of the high order word input multiplexer 1152, comparisons may be made such that the highest of a sequence of compared exponents will end up being stored in the compare and select register 1157.

The compare and select status register 1156 supplies numerical values to buses 639 and 640. This register also receives a clock signal 1165 from control circuitry. The compare and select register 1157 is clocked by a signal 1166 from control circuitry.

Figure 12:
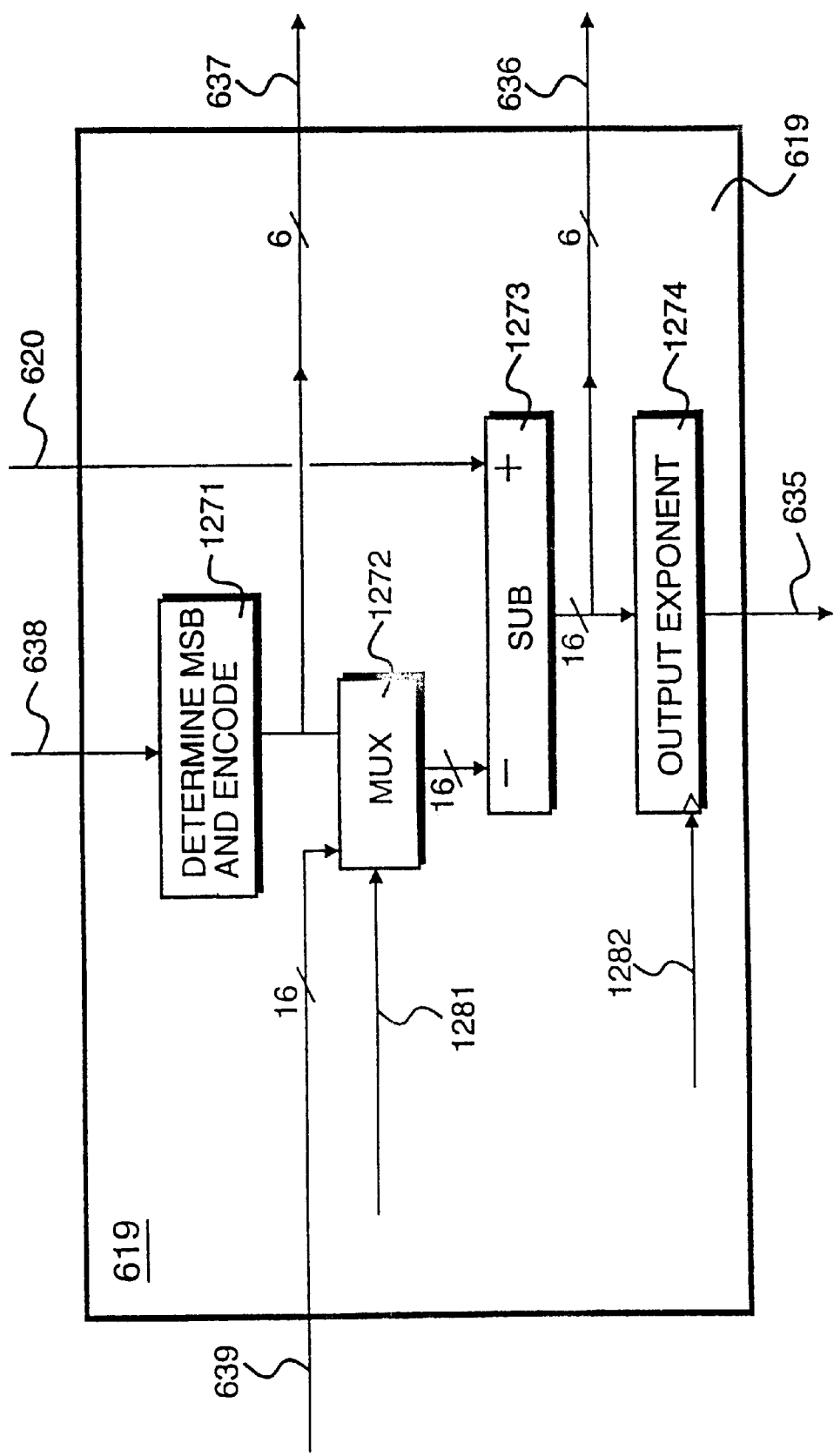
FIG. 12 details the normalising unit shown in FIG. 6.

The normalising unit 619 shown in FIG. 6 is detailed in FIG. 12. The bus 638 supplies 42 bit numerical values to a unit 1271 which determines the most significant bit of the numerical value, and encodes this as a 6 bit value supplied over bus 637. This 6 bit value 637 is further supplied to a multiplexer 1272 which may alternately receive a 16 bit numerical value from the bus 639 connected to the compare and select unit 618. The 16 bit output of the multiplexer 1272 is supplied as a subtracting input to a subtractor 1273. The multiplexer 1272 is controlled by a control signal 1281. An additional input to the subtractor 1273 is supplied from bus 620. The output of the subtractor 1273 is supplied to an output exponent register 1274, which is controlled by a clock signal 1282 supplied from control circuitry. Six bits of the output from the subtractor 1273 are supplied as bus 636. The output of the output exponent register 1274 is supplied as a 16 bit numerical value to the bus 635.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What is claimed is:

1. A data processing circuit comprising:
   a first set of processing elements and a second set of processing elements;

clocking means configured to supply common clocking signals to said processing elements; and means for supplying processing operands alternately to said first set of elements or to said second set of elements from a shared data bus in such manner that said first set of elements are clocked by rising edges of said clocking signals and said second set of elements are clocked by falling edges of said clocking signals.

2. A data processing circuit according to claim 1, wherein operands are supplied alternately from said shared data bus and from an additional data bus to provide four operands per clock cycle.

3. A data processing circuit according to claim 1, wherein each of said sets of processing elements includes means configurable to perform multiplication operations.

4. A data processing circuit according to claim 1, wherein said sets of processing elements includes means configurable to obtain a difference between a pair of floating point exponents.

5. A data processing circuit according to claim 1, wherein results from said first set of elements and results from said second set of elements are suppliable to a common double-clocked processing means, wherein said double-clocked processing means processes information associated with said first set of processing elements in correspondence with said rising edge and processes information associated with second set of processing elements in correspondence with said falling edge.

6. A data processing circuit according to claim 5, wherein said double-clocked processing means performs comparison and selection operations.

7. A data processing circuit according to claim 1, wherein each of said sets of processing elements includes means for performing arithmetic operations.

8. A data processing circuit according to claim 7, wherein at least one of said arithmetic operations includes barrel shifting.

9. A radio telephone comprising a data processing circuit comprising:

a first set of processing elements and a second set of processing elements;

clocking means configured to supply common clocking signals to said processing elements; and means for supplying processing operands alternately to said first set of elements or to said second set of elements from a shared data bus in such manner that said first set of elements are clocked by rising edges of said clocking signals and said second set of elements are clocked by falling edges of said clocking signals.

10. A radio telephone according to claim 9, further comprising double-clocked processing means, responsive to results from said first set of elements and results from said second set of elements, for processing information associated with said first set of processing elements in correspondence with said rising edge and processing information associated with said second set of processing elements in correspondence with said falling edge.

11. A radio telephone according to claim 9, wherein said sets of processing elements includes means configurable to obtain a difference between a pair of floating point exponents.

12. A method of processing data comprising the steps of:

supplying the same clocking signals to a first set of processing elements and a second set of processing elements, and supplying processing operands alternately to said first set of elements or to said second set of elements from a shared data bus in such manner that said first set of elements are clocked in correspondence with rising edges of said clocking signals and said second set of elements are clocked in correspondence with falling edges of said clocking signals.

13. A method as in claim 12, further comprising the steps of:

supplying results from said first set of elements and results from said second set of elements to a common double-clocked processing means, and using said double-clocked processing means for processing information associated with said first set of processing elements in correspondence with said rising edge and processing information associated with said second set of processing elements in correspondence with said falling edge.

14. A method as in claim 12, further comprising the step of configuring said sets of processing elements to obtain a difference between a pair of floating point exponents.

15. A method as in claim 12, further comprising the steps of configuring said sets of processing elements to perform multiplication operations and performing arithmetic operations wherein at least one of said arithmetic operations includes barrel shifting.

16. A data processing circuit comprising:

a first set of processing elements and a second set of processing elements;

clocking means configured to supply common clocking signals to said processing elements, wherein said first set of elements are clocked by rising edges of said clocking signals and said second set of elements are clocked by falling edges of said clocking signals; and double-clocked processing means, responsive to results from said first set of elements and results from said second set of elements, for processing information associated with said first set of processing elements in correspondence with said rising edge and processing information associated with said second set of processing elements in correspondence with said falling edge.

17. A data processing circuit according to claim 16, wherein said double-clocked processing means performs comparison and selection operations.

18. A data processing circuit according to claim 16, wherein said sets of processing elements includes means configurable to obtain a difference between a pair of floating point exponents.

19. A data processing circuit according to claim 16, wherein each of said sets of processing elements includes means configurable to perform multiplication operations and means for performing arithmetic operations.

20. A data processing circuit according to claim 19, wherein at least one of said arithmetic operations includes barrel shifting.

* * * * *